United States Patent [19]

Sonthonnax

[11] Patent Number: 4,848,892
[45] Date of Patent: Jul. 18, 1989

[54] ADJUSTABLE TEMPLES FOR SPECTACLE FRAMES

[75] Inventor: Robert Sonthonnax, Marchon, France

[73] Assignee: Internationale de Lunetterie S.A., Oyonnax, France

[21] Appl. No.: 159,127

[22] Filed: Feb. 23, 1988

[30] Foreign Application Priority Data

Mar. 20, 1987 [FR] France ................. 87 04106

[51] Int. Cl.⁴ ............................................. G02C 5/20
[52] U.S. Cl. ..................................... 351/118; 351/119; 351/113
[58] Field of Search ............... 351/111, 113, 118, 119, 351/117

[56] References Cited

U.S. PATENT DOCUMENTS 3,052,161 9/1962 Berend .................................. 351/118
3,667,834 6/1972 Davison et al. ..................... 351/118
4,670,915 6/1987 Evans .................................. 351/118

Primary Examiner—Rodney B. Bovernick
Assistant Examiner—P. M. Dzierzynski
Attorney, Agent, or Firm—Dowell & Dowell

[57] ABSTRACT

An adjustable temple for spectacle frames wherein the temple includes an inner element which includes a body portion slideable within an outer element and which inner element also includes an outer head portion which extends through an elongated opening in the outer element with such head being selectively engageable with notches formed in the exterior of the outer element and wherein a slideable locking sleeve may be adjustably positioned over the two elements of the adjustable temple so as to retain the two elements in a selectively adjusted position.

5 Claims, 1 Drawing Sheet

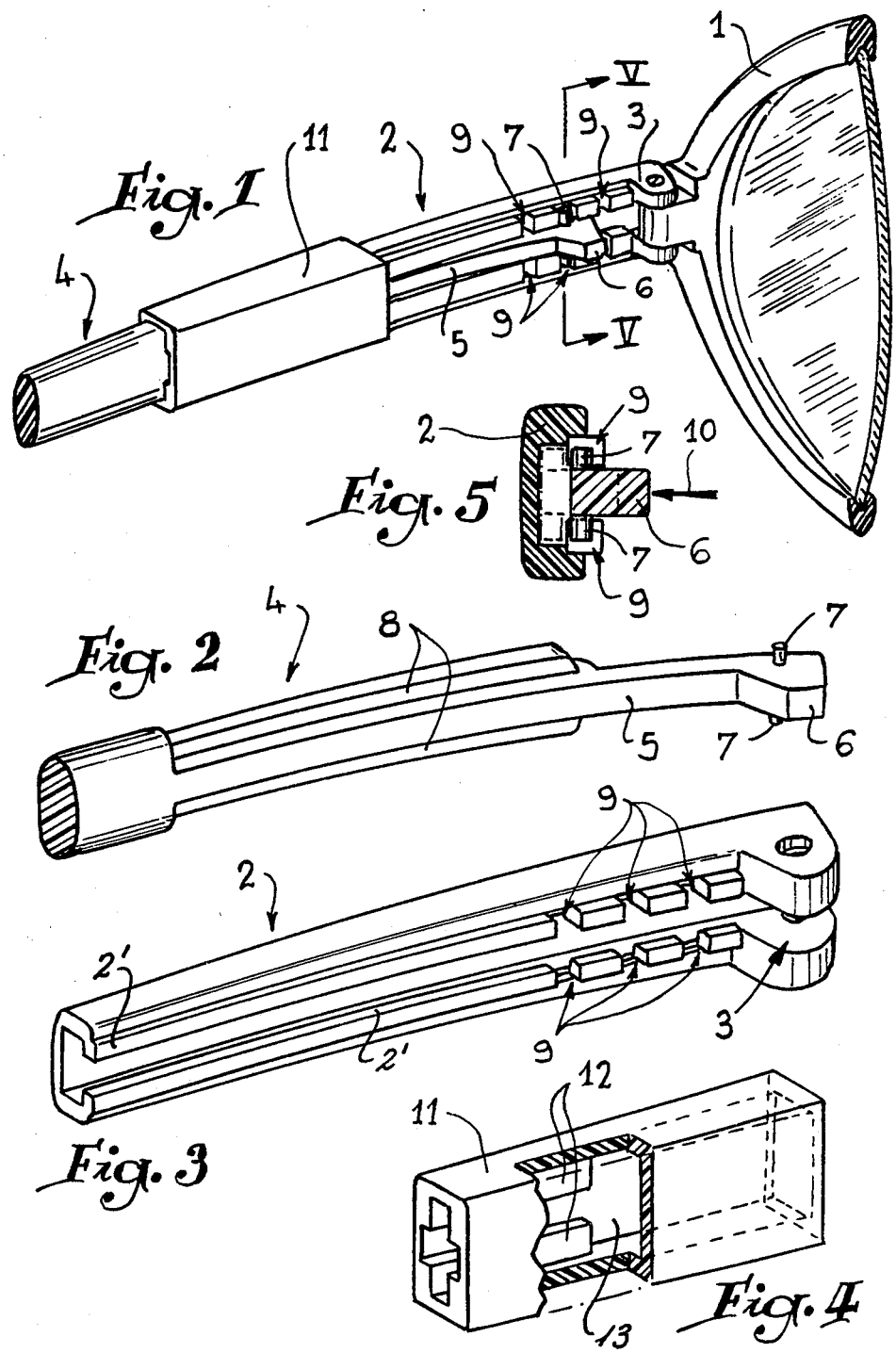

ADJUSTABLE TEMPLES FOR SPECTACLE FRAMES

BACKGROUND OF THE INVENTION

Field of the Invention

The present invention relates to a side element of a spectacle frame whose length can be adjusted with a view to the precise adaptation of the frame to the facial morphology of the wearer or to the activity exercised by him/her.

SUMMARY OF THE INVENTION

The side element according to the invention comprises two elements of which one is adapted to be articulated on the face of the frame, while the other presents the conventional bent part adapted to fit behind the ear. It is principally noteworthy in that one of these two elements presents a C-section, inside which is slidably engaged the end of the other element. The other end is provided with parts in relief adapted to clip elastically in one of a series of recessed parts formed in the opposite element.

This system of adjustment is advantageously completed by a ring profiled so as, on the one hand, to hide the connection between the two elements of the side element, and, on the other hand, to avoid any untimely deformation of the C-section.

BRIEF DESCRIPTION OF THE DRAWINGS

The invention will be more readily understood on reading the following description with reference to the accompanying drawings, in which:

FIG. 1 is a partial view in perspective of an adjustable side element or temple of a spectacle frame according to the invention.

FIGS. 2 and 3 show in perspective the end of the two elements constituted the temple of FIG. 1.

FIG. 4 shows, with parts torn away, the ring adapted to serve the two elements of the temple.

FIG. 5 is a vertical section along the transverse plane V—V of FIG. 1.

DESCRIPTION OF THE PREFERRED EMBODIMENT

Referring now to the drawings, and firstly to FIG. 1, reference 1 designates one of the ends of the face of a spectacle frame fitted with two adjustable sides or temples according to the invention. Each of these temples comprises two elements of which one, referenced 2, is articulated on frame 1 via a conventional hinge such as 3, while the other, referenced 4, is sectioned at its free end to present the conventional bent part or earpieces (not shown).

Opposite its bent part, the element 4 is integral with an axial extension 5 (cf. FIG. 2) which presents smaller dimensions in section and which is provided at its end with a head 6 having two opposite pins 7. At its junction with the principal part of the element, the extension 5 comprises two longitudinal lips or flanges 8. It will be observed that the extension 5 presents in plan a slightly arcuate section.

As shown in FIG. 3, element 2 presents a cross-section in the form of a C opening or channel inwardly of the frame and which is adapted to form a slideway for the projecting flanges 8 of the extension 5. The C-shaped channel is defined by a pair of spaced and opposing flanges 2'. Immediately to the rear of the hinge 3, the C-section is interrupted transversely at three points to determine three recessed parts or notches 9 disposed in transverse pairs. The width of these notches 9 corresponds to the thickness of the lateral pins 7 of the head 6 mentioned above.

It will be readily appreciated that the extension 5 is adapted to be engaged inside the element 2 by slight elastic deformation of the extension. Under these conditions and as illustrated in FIG. 5, the pins 7 clip in one of the pair of notches 9 and the wearer is thus in a position to make a precise adjustment of the total length of each of the sides of the temple.

Such adjustment may be modified at any moment since it suffices to exert a pressure (arrow 10 of FIG. 5) to release the pins 7 from the notches 9, to displace one of elements 2 or 4 with respect to the other by a longitudinal movement, and to release the pressure on the head 6 to allow the pins 7 to clip again in the notches 9 thus brought opposite thereto.

It goes without saying that the number of these notches 9 may vary to a very large extent.

The area between the end of element 2 and the solid thick part of element 4 may be unsightly. Furthermore, the C-section of element 2 risks opening in untimely manner during use of the frame. In order to overcome these two drawbacks, the invention provides the temples of the spectacle frame with a protecting locking ring or sleeve 11 (FIGS. 1 and 4) made of semi-rigid synthetic material, engaged on that part of the temple which define the connection of the two elements 2 and 4.

The opening of locking ring 11 presents a bore 13 a section whose width decreases from one end to the other, in order to tighten on element 2 which presents a corresponding outer section. It will be noted that ring 11 is rendered captive due to inner stops 12 which cooperate with the head 6 and the flanges 8 in order to allow the ring to be adjusted only by a determined orientation thereof which is different from the orientation of use.

It must, moreover, be understood that the foregoing description has been given only by way of example and that it in no way limits the domain of the invention which would not be exceeded by replacing the details of execution described by any other equivalents.

What is claimed is:

1. An adjustable temple for spectacle frames comprising first and second temple elements, said first temple element including an elongated channel therein and an elongated opening defined by opposing flange portions, said elongated opening extending the length of said channel, at least two recesses formed in said first temple element adjacent said elongated opening and outwardly of said elongated channel, said second temple element including a main body portion which is selectively slideably received within said elongated channel and having an extension portion which extends outwardly of said channel through said elongated opening, head means carried by said extension portion and being selectively engageable within one of said recesses to thereby unite said first and second temple elements, and a locking sleeve slideably disposed about said first and second temple elements so as to prevent the relative adjustment of said first and second temple elements by preventing said head means of said extension portion of said second temple element from disengaging within said one of said recesses.

2. The adjustable temple of claim 1 in which said locking sleeve includes a tapered bore therethrough which varies in cross section so as to progressively clampingly engage said first temple element as said locking sleeve is moved toward said recesses, and stop means positioned within said locking sleeve and extending into said bore thereof for limiting the adjustment of said locking sleeve.

3. The adjustable temple of claim 1 including a number of pairs of vertically spaced recesses in said opposing flange portions of said first temple element, said head means including a pair of oppositely extending pin members, said pin member being selectively engageable with said pairs of vertically spaced recesses.

4. An adjustable temple for spectacle frames comprising first and second temple element, said first temple element including an elongated generally C-shaped channel therein and having an elongated opening extending long the length thereof defined by opposing spaced flange portions, a number of pairs of vertically spaced recesses in said opposing flange portions of said first temple element, said second temple element including a main body portion having a pair of outwardly extending flange elements, said main body portion being selectively slideably receivable within said C-shaped channel of said first temple element, said first temple element including an extension portion which extends outwardly from said main body portion through said opening along said elongated channel, a head means carried by said extension portion of said second temple element, a pair of oppositely extending pin members carried by said head means, each of said pin members being selectively engageable within said pair of vertically spaced recesses, said head means being flexible so as to be selectively engageable with said extension portion of said second temple member to thereby adjust said pin members with respect to said recesses, and a locking sleeve slideably disposed about said first and second temple elements, said locking sleeve having a bore therethrough which is tapered from one end towards another, said locking sleeve being selectively positioned so as to prevent the relative adjustment of said first and second temple elements.

5. An adjustable temple for spectacle frames comprising first and second temple elements, said first temple element including an elongated C-shaped channel therein and an elongated opening, recesses formed in said first temple element adjacent said elongated opening and outwardly of said elongated channel, said second temple element including a main body portion which is selectively slideably received within said elongated channel and having an extension portion which extends outwardly of said channel through said elongated opening, said extension portion having engaging means for selectively engaging within one of said recesses to thereby unite said first and second temple elements, and a locking sleeve slideably disposed about said first and second temple elements so as to prevent the relative adjustment of said first and second temple elements by retaining said engaging means of said extension portion of said second temple element within said one of said recess.

* * * * *